United States Patent [19]

Yamamoto et al.

[11] Patent Number: 4,789,816
[45] Date of Patent: Dec. 6, 1988

[54] STEPPING MOTOR DRIVE CONTROL APPARATUS

[75] Inventors: Kazuto Yamamoto, Chichibu; Kazushi Takahashi, Yokose, both of Japan

[73] Assignee: Canon Denshi Kabushiki Kaisha, Chichibu, Japan

[21] Appl. No.: 62,365

[22] Filed: Jun. 12, 1987

[30] Foreign Application Priority Data

Jun. 14, 1986 [JP] Japan ................................. 61-137327
Jul. 18, 1986 [JP] Japan ................................. 61-167787
Apr. 21, 1987 [JP] Japan ................................. 62-096202

[51] Int. Cl.$^4$ ............................................. H02P 8/00
[52] U.S. Cl. ..................................... 318/696; 318/685
[58] Field of Search ............................... 318/696, 685

[56] References Cited

U.S. PATENT DOCUMENTS 4,429,268  1/1984  Yajima et al. ...................... 318/696

Primary Examiner—William M. Shoop, Jr.
Assistant Examiner—Saul M. Bergmann
Attorney, Agent, or Firm—Spencer & Frank

[57] ABSTRACT

A stepping motor drive control apparatus for controlling the drive of a stepping motor having a plurality of phase coils which are respectively excited to switch the phase. A cycle of a step signal which steps the stepping motor is measured. According to the measured cycle of the step signal, a switching time of the phase coil to be excited is variably set, so that damping and noise are prevented when the stepping motor is driven.

10 Claims, 10 Drawing Sheets

| TIME DATA TABLE | |
|---|---|
| STEP SIGNAL CYCLE | OPTIMUM EXCITING SHIFT TIME |
| $12b_1$ | $c_1$ |
| $12b_2$ | $c_2$ |
| ⋮ | ⋮ |
| $12bn$ | $cn$ |

STEPPING MOTOR DRIVE CONTROL APPARATUS

BACKGROUND OF THE INVENTION

1. Field of the Invention

The present invention relates to a stepping motor drive control apparatus, particularly to a stepping motor drive control apparatus wherein a stepping motor having a plurality of coils is driven in such a way that the coils are switched a plurality of times during one cycle of a step signal.

2. Description of the Prior Art

A stepping motor is widely used as a drive source for various high-precision servo mechanisms. For example, it is used as a drive source for a head seek mechanism which moves record/playback heads in a radial direction crossing tracks of a floppy disc in a floppy disc drive unit for magnetically recording or reproducing information into or from the floppy disc as a magnetic recording medium.

In this head seek mechanism, the above-mentioned type of system is used as a stepping motor drive control apparatus, and a so-called 2-phase, 1-track feed system, wherein the phase of the exciting signal is switched twice during one cycle of a step signal to drive and rotate the stepping motor by a specified angular displacement to move the record/playback heads by one track has been widely used. The conventional arrangement is described in detail below.

FIG. 1 shows an arrangement of a stepping motor drive control circuit in a convenient head seek mechanism.

In FIG. 1, reference numeral 3 designates a stepping motor. By driving the stepping motor 3, a record/playback head 5 is moved in a radial direction of a floppy disc 4, while crossing record tracks on the floppy disc 4.

The stepping motor 3 is driven by a driver 2 under the control of a stepping motor controller 1 having a microcomputer or logic circuits including power transistors.

A power source voltage is applied to the controller 1 and the driver 2 from a power circuit (not shown) through a power line 11. A drive select signal 7 for selecting a disc drive unit assigned to the controller 1 shown in FIG. 1, a step signal 8 which is a pulse signal for driving the stepping motor 3 by one track at a time, and a direction-in signal 9 designating a moving direction (rotating direction of the stepping motor 3) of a record/playback head 5 either as in-direction or as out-direction (inward direction or outward direction of the disc 4) are inputted into the controller 1 from a host system (not shown) via signal lines 7-9.

Assuming here that the stepping motor 3 is of a 4-phase arrangement, that is, it is provided with four coils, and is driven by a 2-phase exciting system in response to these control signals, the controller 1 outputs phase exciting signals $\phi A$-$\phi D$ respectively to the driver 2 via four output signal lines 10 to drive the stepping motor 3.

FIG. 2 is a timing chart illustrating various signals in various portions in FIG. 1. As shown in FIG. 2, a level change or phase shift of the exciting signals $\phi A$-$\phi D$ takes place at instants T0 and T2 synchronized with the leading edges of the step signal 8 as well as at an intermediate instant T1 between the two instants T0 and T2.

The exciting sequence is switched according to the level of the direction-in signal 9.

The magnitude of damping (attenuating vibration) during driving of the stepping motor 3 varies depending upon the timing of the intermediate exciting phase switching instant T1. The timing of the switching instant T1 at which this damping is minimized varies in accordance with the period of the step signal 8 or the so-called step rate.

In an arrangement, however, where the timing of the switching instant T1 is set at a specific instant, the instant that the damping is minimized also changes as the step rate changes, but the switching instant T1 cannot be set variably.

For this reason, the conventional system has involved a problem that the motor damping and the noise caused thereby cannot be successfully controlled in response to a variation of the step rate. This will be explained further in detail.

If it happens that the switching point T1 located right in the middle between the switch points T0 and T2 as is the case in FIG. 2, the following relationship is given.

$$T1-T0=T2T1.$$

Thus, the exciting times of the respective phases of the exciting signal in one cycle of the step signal 8 or in a one-track movement become equal to each other.

If, however, the cycle corresponding to the pulse rate (frequency) of the step signal 8 increases then the following relationship is obtained.

$$T1-T0<T2-T1.$$

Accordingly, a difference occurs between the exciting times of the respective excitation phases in one cycle of the step signal 7, resulting in imbalance of the excitation among the phases. This unbalance increases the damping of the stepping motor 3 producing increased noise.

SUMMARY OF THE INVENTION

It is an object of the present invention to provide a stepping motor drive control apparatus in which motor damping or noise is not caused even if there occurs a change in the step rate of the step signal which determines the timing for changing switching at least one of the plurality of phase coils of a stepping motor.

The first aspect of the present invention resides in a stepping motor drive control apparatus for controlling the drive of a stepping motor, comprising:

measuring means for measuring a cycle of a step signal stepping the stepping motor;

changing means for changing an exciting phase of the stepping motor; and control means for controlling a timing that the exciting phase is changed by the changing means in accordance with a cycle of the step signal measured by the measuring means so as to minimize damping of the stepping motor.

According to the first aspect of the present invention, a cycle of the step signal is measured and a change of the cycle is detected by the measuring means, and the switching instants of the exciting phases of at least one of the phase coils of the stepping motor are variably determined by the control means according to the measuring results from the time measuring means, so that damping or noise of the stepping motor is diminished.

The second aspect of the present invention resides in a stepping motor drive control apparatus for controlling the drive of a stepping motor, comprising:

measuring means for measuring a cycle of a step signal stepping the stepping motor;

changing means for changing an exciting phase of one of the coils of the stepping motor; and control means for controlling a timing that the exciting phase of one of the coils is changed by the changing means in accordance with a cycle of the step signal measured by the measuring means, so that the timing corresponds to a timing at which the cycle of the step signal measured by the measuring means is equi-time-divided.

According to the second aspect of the present invention, the cycle of the step signal is measured by the measuring means, and the control means controls to make the switching instants of the stepping motor exciting phase coincident with those instants at which the measured cycles are equally divided, so that the stepping motor may be driven according to the period of the step signal, even if the cycle is changed, and accordingly damping or noise of the stepping motor is minimized.

The third aspect of the present invention resides in a stepping motor drive control apparatus for controlling the drive of a stepping motor, comprising:

measuring means for measuring a cycle of a step signal stepping the stepping motor;

changing means for detecting whether an instant time reaches a time of a timing of changing an exciting phase of at least one coil of the stepping motor to change the exciting phase of at least one coil of the stepping motor when an instant time reaches the timing;

first set means for setting the timing of the changing means in accordance with an external command; and second set means for setting the timing of the changing means in accordance with the cycle of the step signal measured by the measuring means in such a way that damping of the stepping motor is minimized.

According to the third aspect of the present invention, the switching instants of the exciting phases of at least one of a plurality of phase coils of the stepping motor are changed in accordance with the change of the step signal and the switch instants of the stepping motor are instructed externally, so that the exciting phases are switched in accordance with the cycle of the step signal and therefore damping or noise of the stepping motor is minimized.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

Figure 3:
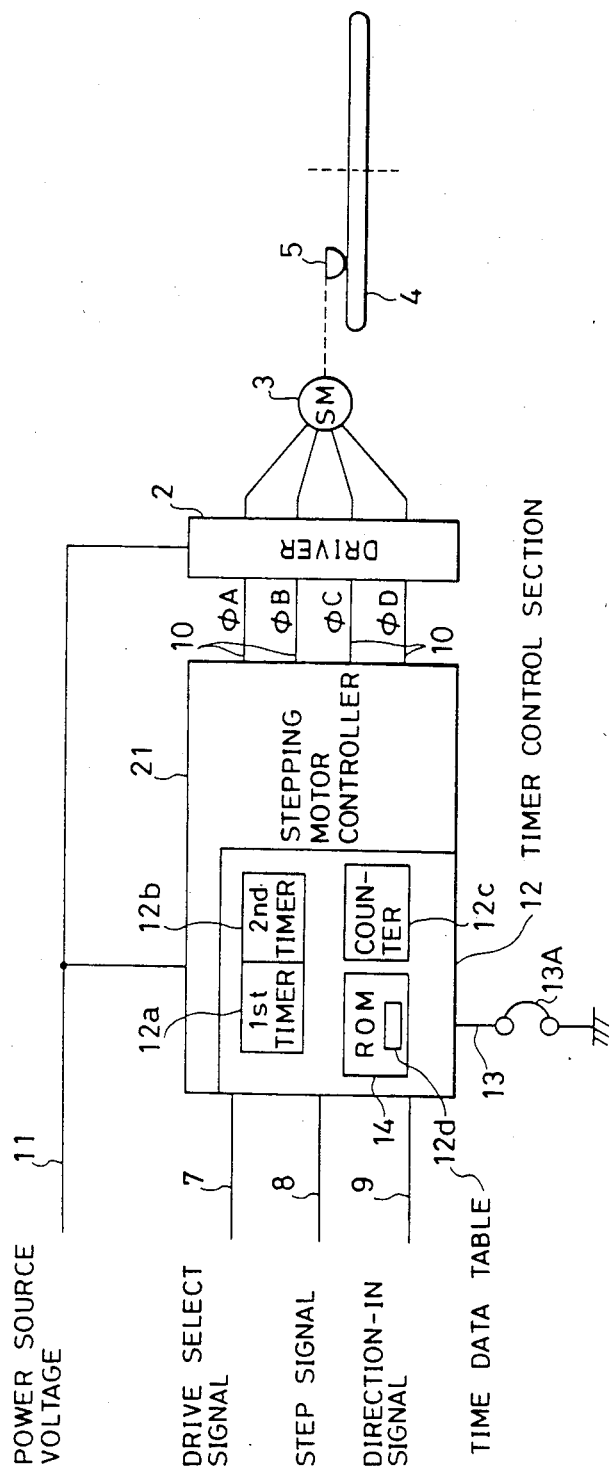
FIG. 3 is a block diagram showing a stepping motor drive control circuit in the first embodiment of the present invention.

FIG. 3 shows an embodiment of an arrangement of a control circuit for performing stepping motor drive control in a head seek mechanism of the floppy disk drive apparatus described before, in accordance with the first aspect of the present invention. In FIG. 3, portions like or corresponding to those shown in FIG. 1 are indicated by the same reference numerals, and a detailed description thereof is omitted.

Figure 1:
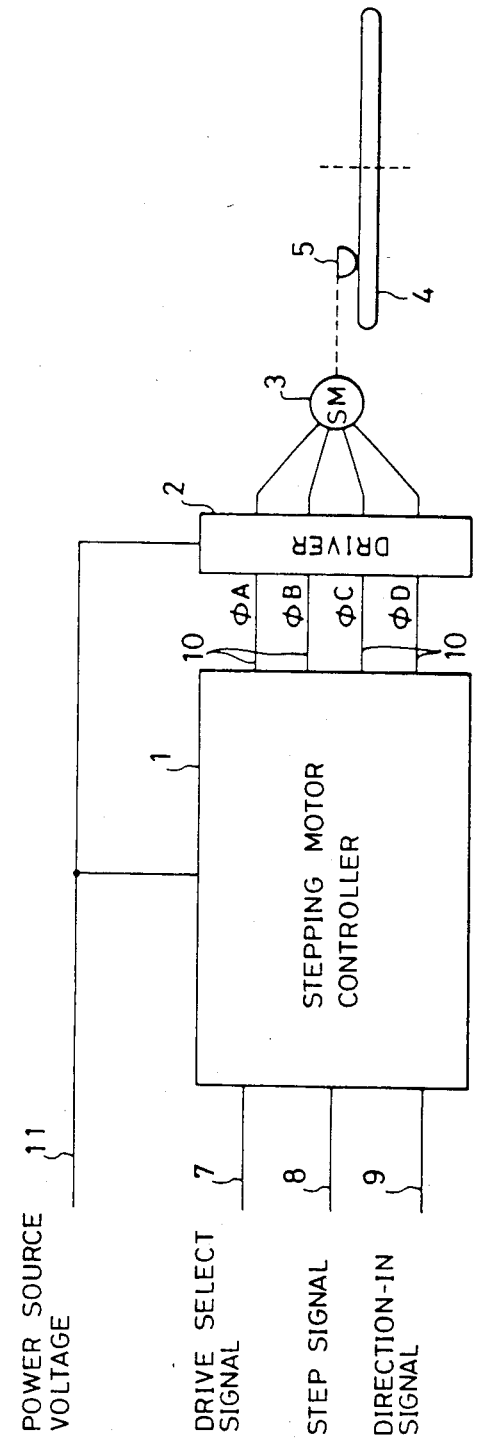
FIG. 1 is a block diagram showing a stepping motor drive control circuit in a conventional floppy disc drive apparatus.
Figure 2:
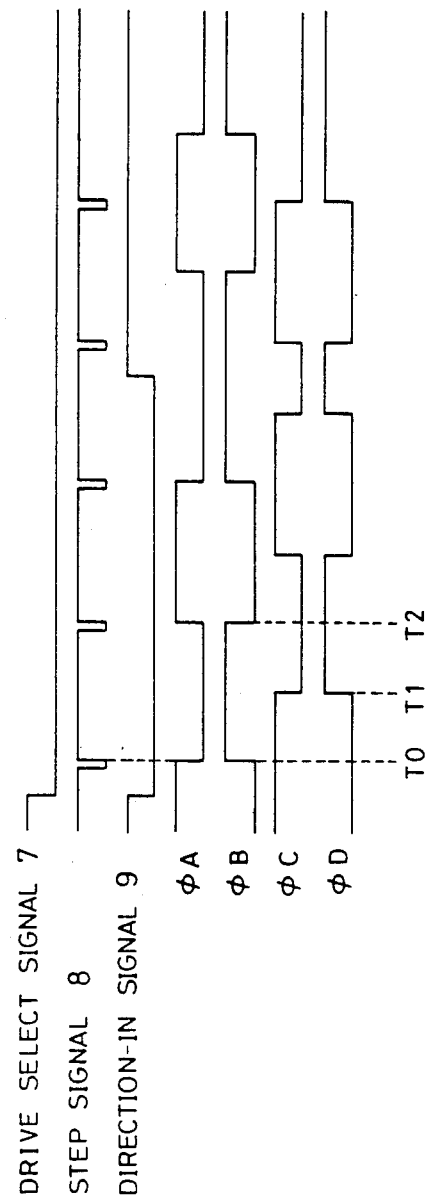
FIG. 2 is a timing chart illustrating various signals for explaining operations of various portions in FIG. 1.

In the arrangement shown in FIG. 3, a stepping motor 3 has a 4-phase coil arrangement like the conventional example shown in FIG. 1. A stepping motor controller 21 outputs exciting signals $\phi A$-$\phi D$ by a 2-phase exciting system in the form of the above-described 2-phase 1-track feed system in response to the drive select signal 7, the step signal 8, and the direction-in signal 9 to drive the stepping motor 3 through the driver 2.

In the arrangement shown in FIG. 3, the arrangement of the control section 21 is different from the conventional arrangement shown in FIG. 1 and variably controls the intermediate exciting phase switching instant T1 to an optimum point at which the damping of the stepping motor 3 is minimized according to the cycle of the step signal. For this purpose, the control section 21 may consist of a microcomputer having a timer control section 12 for controlling timing of the shift instant T1.

The timer control section 12 can be formed by microcomputer hardware which constitutes the controller 21 and software of programs to be executed by the microcomputer. The timer control section 12 is provided with first and second timers 12a and 12b, a read only memory (ROM) 14 and a counter 12c to perform the timing control. These parts will be described specifically below.

The first timer 12a determines the intermediate exciting phase switching instant T1, and sets time data (i.e., time data a or c to be described later) indicating a time duration from the leading edge of the step signal 8 to the switching instant. The exciting phase (the term "exciting phase" as used herein, refers to an excited phase of the motor) is switched in response to an output signal from the first timer 12a which is produced when the first timer 12a counts up the set time.

The second timer 12b measures a cycle of the step signal 8. The timer 12b is also used to judge whether this signal is the final step signal in one seek operation upon elapse of a predetermined limit time d from the instant that one step signal is inputted, namely, whether one seek operation has been completed, as well as to measure the limit time d.

Further, the first and second timers 12a and 12b may be either provided in the form of a hardware timeer or a software timer. A single timer may be shared in a time sharing fashion for both the timers 12a and 12b, instead of providing the two times.

Figures 4, 10:
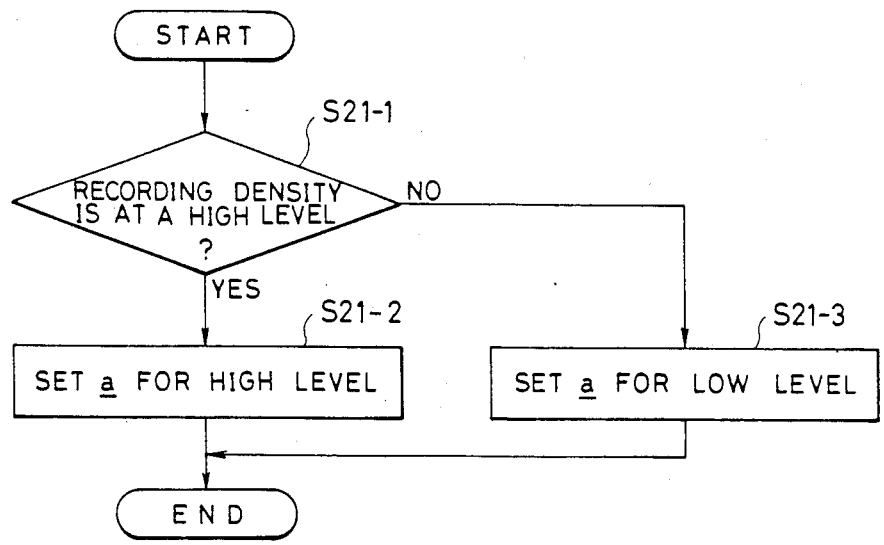
FIG. 4 is an explanatory diagram showing an example of contents of the time data table 12d shown in FIG. 3.
FIG. 10 is a flow chart showing an example of a control procedure for the timer controller 32 shown in FIG. 9.

The ROM 14, a part of the microcomputer which constitutes the controller 21, stores a control program of the controller 21 including the timer control section 12, and particularly the ROM 14 includes a time data table 12d for performing timing control of the timer control section 12. This time data table 12d, as shown in FIG. 4, stores time data or optimum time data $C_1$-$C_n$ which indicates a time duration from a leading edge of the step signal to an intermediate exciting phase switching instant at which damping of the stepping motor is minimized and which varies with the cycles $12b_1$-$12b_n$ of the step signal, corresponding respectively to the cycles $12b_1$-$12b_n$ (measured by the second timer 12b). Further, the optimum time data $C_1$-$C_n$ are derived from experiment or the like. Alternatively, the ROM 14 may be replaced by a random access memory (RAM) and the time table may be transferred to the RAM from a host computer or the like.

Next, the counter 12c functions to count the number of inputted step signals to judge whether the inputted step signal is the initial step or second or subsequent step in one sek operation when the stepping motor 3 is driven.

The timer control section 12 is provided with an initial data setting terminal 13 for selecting a time data a from a plurality of kinds of time data a for tentatively setting the intermediate exciting phase switching instants only when driving the first step of the stepping motor 3 in one seek operation. It is so arranged that an input signal level at this terminal 13 is set by, for example, a jumper switch 13A to set initial data adapted to the signal level from a plurality of initial data.

In such an arrangement, the controller 21, in a seek operation, drives the stepping motor 3 by switching the exciting phase at the leading edge of the respective step signals and at instants at which the first timer 12a of the timer control section 12 counts up the set time.

Figure 5:
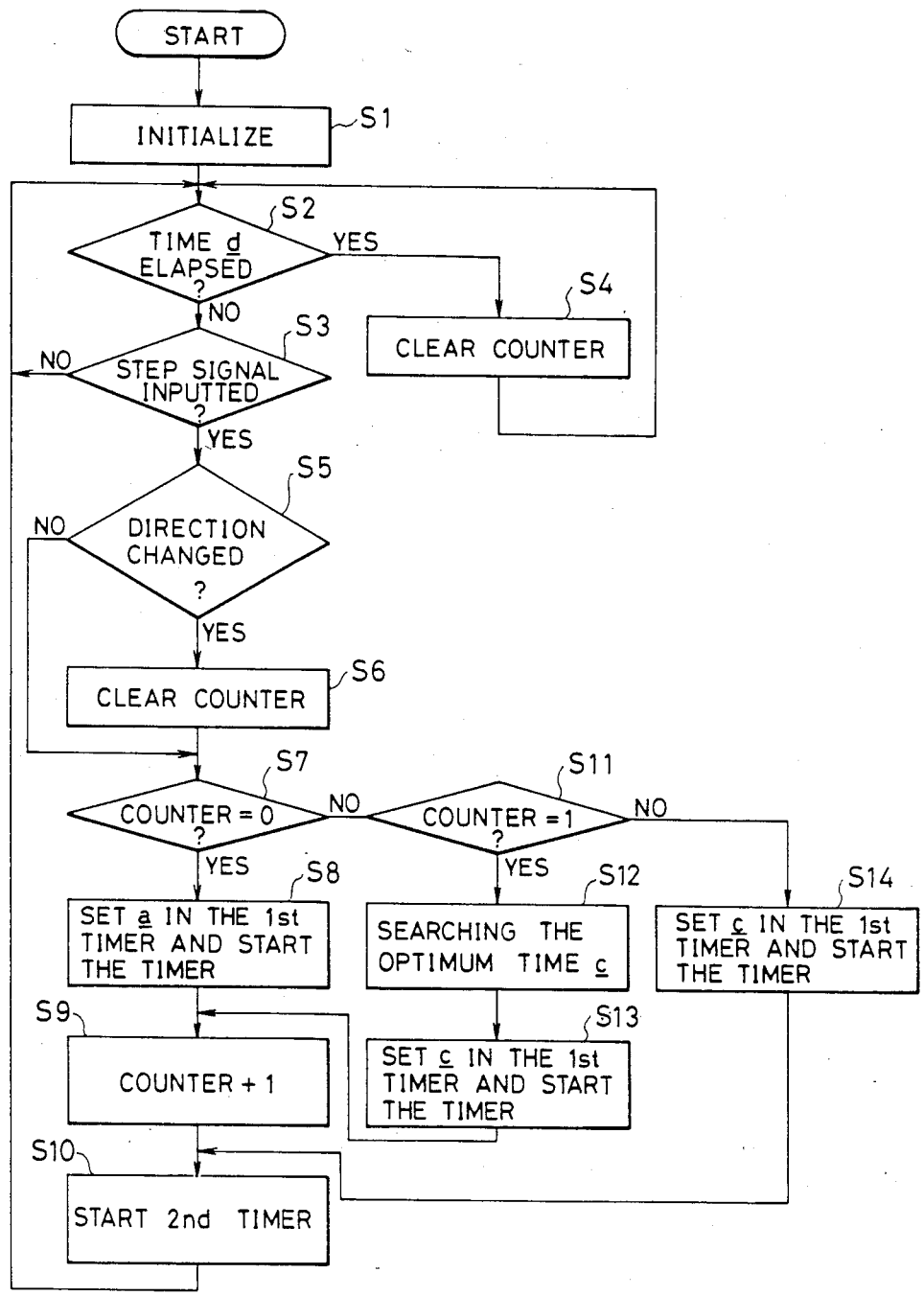
FIG. 5 is a flow chart showing an example of a control procedure for the timer control section 12 shown in FIG. 3.
Figure 6:
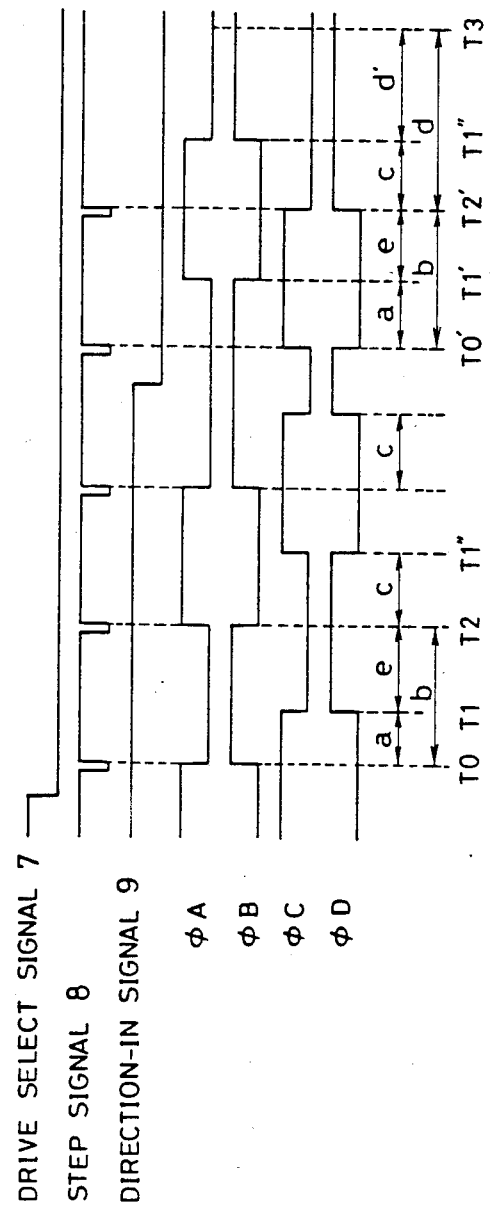
FIG. 6 is a timing chart illustrating various signals for explaining operations of various portions in FIGS. 3 and 7.

FIG. 5 shows an example of a processing procedure executed by the timer control section 12 in the abovementioned period. FIG. 6 illustrates timings of various signals shown in FIG. 3. Referring to FIGS. 5 and 6, the processing and operation of the timer control section 12 will be explained in detail below.

The timer control section 12, in initial step S1 shown in FIG. 5, performs an initial setting, including clearing the counter 12c. At this instant, the data a is selected by the initial data setting terminal 13, as mentioned above.

Next, the timer control section 12, while waiting for the step signal inputted in a loop of steps S2 and S3, watches the second timer 12b to check whether, upon elapse of the limit time d from an instant that the preceding step signal is inputted, this signal indicates the final step in one seek operation, and whether one seek operation is completed or not.

When the limit timed has elapsed (at instant T3 in FIG. 6), the counter 12c is cleared in step S4 in order to indicate that the step signal being inputted subsequently corresponds to the initial step in a new seek operation.

Subsequently, when the step signal 8 is inputted in step S3, it is checked in step S5 whether the level of the direction-in signal has changed since the step signal was previously inputted, and if the signal level is changed (at instant T0' in FIG. 6), the counter 12c is cleared in step S6 in order to indicate that the step signal now entered is the initial step signal is a new seek operation.

Next, it is checked in step S7 whether the count value in the counter 12c is "0" or not. Namely, it is judged whether the step signal inputted in preceding step S3 is the initial step signal in a new seek operation or not.

If the count is "0" (at instant T0 or T0' in FIG. 6), the time data a set already by the initial data setting terminal 13 is set in the first timer 12a in step S8, and this timer 12a starts counting immediately.

Next, the counter 12c is incremented in step S9, and then in step S10 the second timer 12b starts measuring the step signal cycle or the limit time d.

Here, in case that the first and second timers 12a and 12b are formed by one timer, the timer 12a is immediately restarted at the instant (instant T1 or T1', T1" in FIG. 6) that the timer 12a has counted up the time a or c, to measure a time e in FIG. 6 to determine the cycle b the sum a and e. If the step signal is not inputted, the timer 12a repeats its counting operation, so that the limit time d may be measured from a or c+d' by measuring the time d' shown in FIG. 6.

After step S10, the procedure returns to step S2 and repeats the above-described procedure.

On the other hand, if the judgement in step S7 is negative, namely, if the step signal inputted in preceding step S3 is found to be the step signal corresponding to the second or subsequent step in one seek operation, then the procedure moves to step S11 to check whether the count value in the counter 12c is "1" or not.

If the count value is "1", namely, if the step signal corresponds to the second step, the operation proceeds to step S12 to determine the step signal cycle from the output of the second timer 12b, and further determines the optimum time data c for the exciting phase switch suitable in this cycle by searching the time data table 12d.

Next, in step S13, the optimum time data c is set in the timer 12a and then the timer 12a starts immediately. In step S9, the counter 12c is incremented by one and then in step S10 the timer 12b stats. Then, the procedure returns to step S2 to repeat the following procedure.

If the judgement in step S11 is negative, namely, after the third step, the procedure moves to step S14 in which the time data c previously obtained is set in the timer 12a and this timer 12a immediately starts. In subsequent step S10, the timer 12b starts and then procedure returns to step S2.

Under the control by the timer control section 12, in each seek operation initiating at the instant T0 or T0' in FIG. 6, the exciting phase, after the second step, is switched at the instants T2 and T2' synchronized with the leading edges of the respective step signals and at the instant T1" at which the optimum time c corresponding to the cycle b of the step signal has elapsed.

That is, according to the present embodiment, in each seek operation, intermediate switching of the exciting phase after the second step takes place at an optimum instant that the damping of the stepping motor 3 is minimized in accordance with the cycle b of the step signal, so that the damping and noise caused thereby can be minimized. Even if the step signal cycle varies in accordance with each seek operation, intermediate exciting phase switching instants are variably determined according to the cycle b, so that damping and noise may be minimized.

While in the above embodiment of the optimum time c set in the second step of each seek operation is not changed after the third step, there is no problem in this connection, since the cycle b is not changed in the course of one seek operation. That is, in a floppy disc drive apparatus, the step rate is set by the control command from a host system and is not changed in the course of one seek operation.

Further, the present invention as described above is, of course, applicable for the stepping motor drive control in various types of equipment other than a floppy disc drive apparatus. In such cases, if the step rate is continuously variable, it is sufficient that the step signal cycle is measured intermittently at a suitable time to control the intermediate exciting phase switch instant.

While in the above embodiment, the exciting phase is switched twice in one step signal cycle, the present invention is, of course, applicable also to a system where the exciting phase switches more than 3 times in one cycle.

Figure 7:
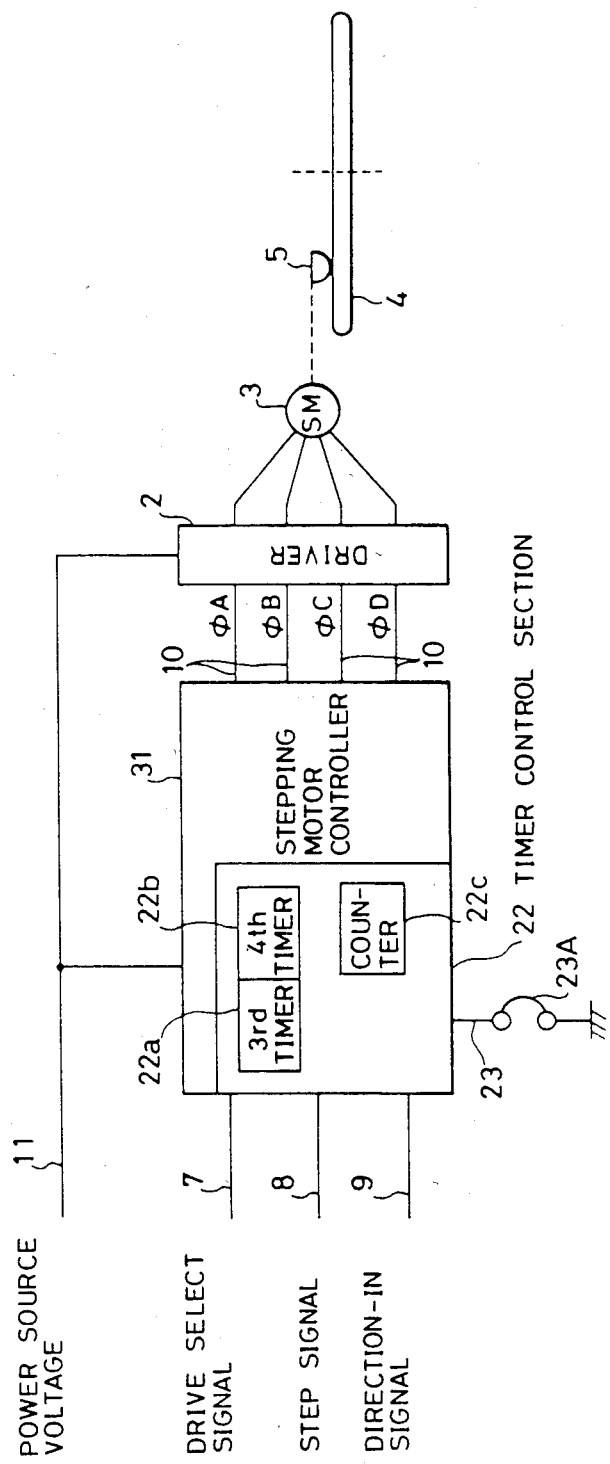
FIG. 7 is a block diagram showing a stepping motor drive control circuit in the secod embodiment of the present invention.

FIG. 7 shows an embodiment of a control circuit arrangement in the second aspect of the present invention.

In the arrangement shown in FIG. 7, a stepping motor 3 has a 4-phase coil arrangement like the conventional example shown in FIG. 1. A stepping motor controller 21 outputs exciting signals φA-φD by a 2-phase exciting system in the form of the above-described 2-phase 1-track feed system in response to the drive select signal 7, the step signal 8, and the direction-in signal 9 to drive the stepping motor 3 through the driver 2.

The arrangement of FIG. 7 is different from the conventional example shown in FIG. 1 in that a timer control section 22 is provided in a controller 31. When the controller 31 switches the exciting phase at instants synchronized with the leading edge of the respective step signals and at intermediate instants therebetween, while driving the stepping motor 3, the timer control section 22 controls the intermediate exciting phase switch instants in a manner that the intermediate instants are positioned exactly at the middle points at which one step signal cycle is equally divided into two equal periods. The timer control section 22 is formed by a software program executed by the controller 31 which is a microcomputer.

The timer control section 22 has a third timer 22a for setting the intermediate exciting switch instants, and a fourth timer 22b for measuring the step signal cycle. These third and fourth timers 32a and 32b can be formed either by means of hardware or by means of software. Alternatively, a single timer can be used selectively as the third and fourth timers 22a and 22b instead of the two timers.

The timer control section 22 has a counter 22c for counting the number of inputted step signals to judge whether the step signal inputted when driving the stepping motor 3 is the first step or second or subsequent step in one seek operation.

The time control section 22 has an initial data setting terminal 23 for selecting and presetting time data a from a plurality of kinds of time data a for tentatively setting the intermediate exciting switch instants only when the first step of the stepping motor 3 is driven in one seek operation. It is so arranged that an input signal level at this terminal 23 is set by, for example, a jumper switch 23A, to set initial data adapted to the signal level from a plurality of initial data.

In such an arrangement, the controller 31, in the seek operation, drives the stepping motor 3 with by switching the exciting phase at the leading edge of the respective step signals and at intermediate instants which the third timer 22a of the timer control section 22 counts up to the set time.

Figure 8:
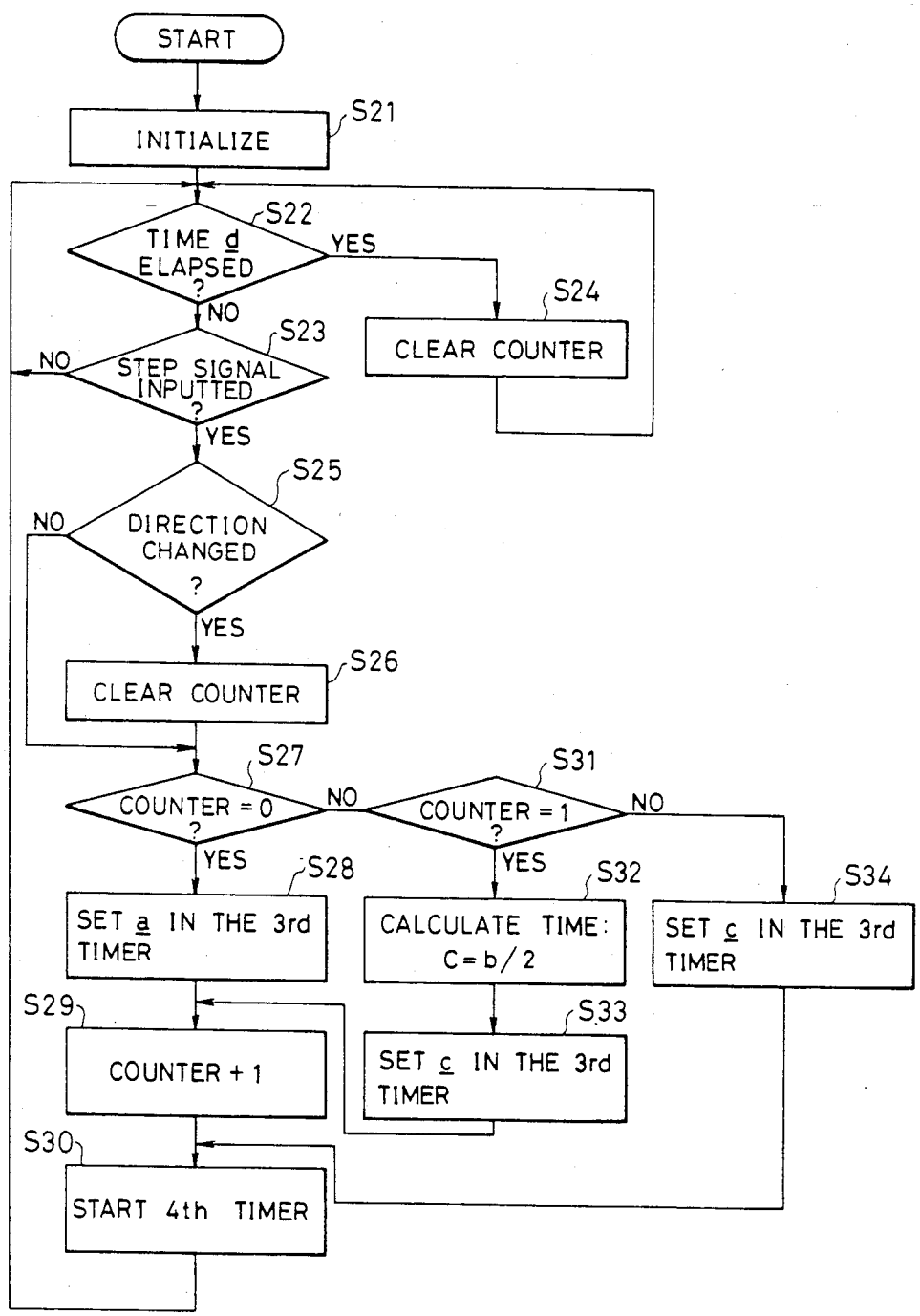
FIG. 8 is a flow chart showing an example of a control procedure for the timer control section 22 shown in FIG. 7.

FIG. 8 shows an example of a processing procedure executed in the timer control section 22 in the above-mentioned period. FIG. 6 illustrates timing of various signals in FIG. 7. Referring to FIGS. 6 and 8, the processing and operation of the timer control section 22 will be described in detail below.

The timer control section 22, in initial step S21 shown in FIG. 8, performs initial setting, including clearing the counter 22c. Also, at this instant, the time data a is selected by the initial data setting terminal 23.

Next, the timer control section 22, whlie waiting for the step signal inputted in a loop of steps S22 and S23, checks whether the predetermined limit time d in FIG. 6 has elapsed or not from the instant that the preceding step signal was inputted. The time limit d is one for judging that the preceding step signal is the final step signal in one seek operation (at an instant T2' in FIG. 6), namely, that one seek operation has been completed. Further, the limit time d is measured either by the fourth timer 22b or the a fifth timer.

If the limit time d has elapsed (at the instant T3 in FIG. 6), the counter 22 is cleared in step S24 in order to indicate that the next step signal being inputted corresponds to the initial step in a new seek operation.

Subsequently, if a step signal is inputted in stepp S23, it is checked in step S25 whether the level of the direction-in signal has changed since the step signal was previously inputted, and if the step signal level is changed (at the instant T0' in FIG. 6), the counter 22c is cleared in step S26 in order to indicate that the currently inputted step signal is the initial step in a new seek operation.

Next, it is checked in step S27 whether the count value in the counter 22c is "0" or not. Namely, it is judged whether the step signal inputted in preceding step S23 is the initial step signal in a new seek operation or not.

If the count is "0" (at the instant T0 or T0' in FIG. 6), the time data a already set by the initial data setting terminal 23 is set in the third timer 22a in step S28, and the third timer 22a starts counting immediately. Subsequently, the counter 32c is incremented at step S29, and then the fourth timer 22b for measuring the step signal cycle b in FIG. 6 is started at step S30. When the third and the fourth timers 22a and 22b are formed by one timer, the single timer is restarted immediately at the instant (at the instant T1 or T1' in FIG. 6) that the single timer has counted up the time a, to measure the time e in FIG. 6, so that the time b is determined by the sum a+e. Next, the procedure returns to step S22 to repeat the above procedure.

On the other hand, if the judgement in step S27 is negative, namely, if the step signal inputted in the preceding step S23 is found to be the step signal corresponding to the second or subsequent step in one seek operation, then the procedure proceeds to step S31 to check whether the count value in the counter 22c is "1" or not.

If the count value is "1", namely, if the step signal corresponds to the second step, time data c equal to one half of the time data b of the cycle determined by the fourth timer 22b is calculated in step S32. The time data c is set in the third timer 22a in step S33, and then this timer 22a starts immediately. After the start, in step S29, the counter 22c is incremented. In step S30, the fourth counter 22b is started. Then, the procedure returns to step S22.

Also, if the judgment in step S31 is negative, namely, after the third step, the procedure proceeds to step S34, in which the previously determined time data c is set in the timer 22a, and this timer 22a immediately starts. The fourth timer 22b is started at step S30 and then the procedure returns to step S22.

With the procedure of the timer control section 22 as described above, in each seek operation initiating at the instant T0 or T0', in FIG. 6 the exciting phase after the second step is switched at the instant synchronized with the leading edge of each step signal and at the middle instant at which the time c equal to one half of the step signal cycle b, has elapsed from the synchronized instant.

Therefore, the exciting times in the respective phase coils of the stepping motor 3 are equal to each other in one cycle of the step signal, namely, in one step, and accordingly the excitation in the respective phases are well balanced regardless of the step rate. As a result, the damping of the stepping motor 3 and noise caused thereby can be decreased.

In the above description, the measurement of the step signal cycle b is limited only to the initial step in each seek operation, but there is no problem in this regard, since the cycle b is not changed in the course of one seek operation. That is, in a floppy disc drive apparatus, the step rate is set by the control command from a host system and is not changed in the course of one seek operation.

Further, the present invention as described above is applicable, of course, to the stepping motor drive control in various types of equipment other than a floppy disc drive apparatus. In such a case, if the step rate is continuously variable, it is sufficient that the step signal cycle is measured intermittently at a suitable timing to control the intermediate exciting phase switching instant.

While in the above embodiment, the exciting phase is switched twice in one step signal cycle, and the exciting phase switching instants are controlled to be positioned at points that the cycle is divided into two equal periods, other exciting systems can be employed in which switching instants can be controlled to be positioned at instants that one cycle is equally divided into equal time intervals according to the number of switches in one cycle. For example, instants which equally divide one cycle into 3 equal periods are switched 3 times in one cycle, and instants which equally divide one cycle into 4 equal periods are switched 4 times in one cycle.

Figure 9:
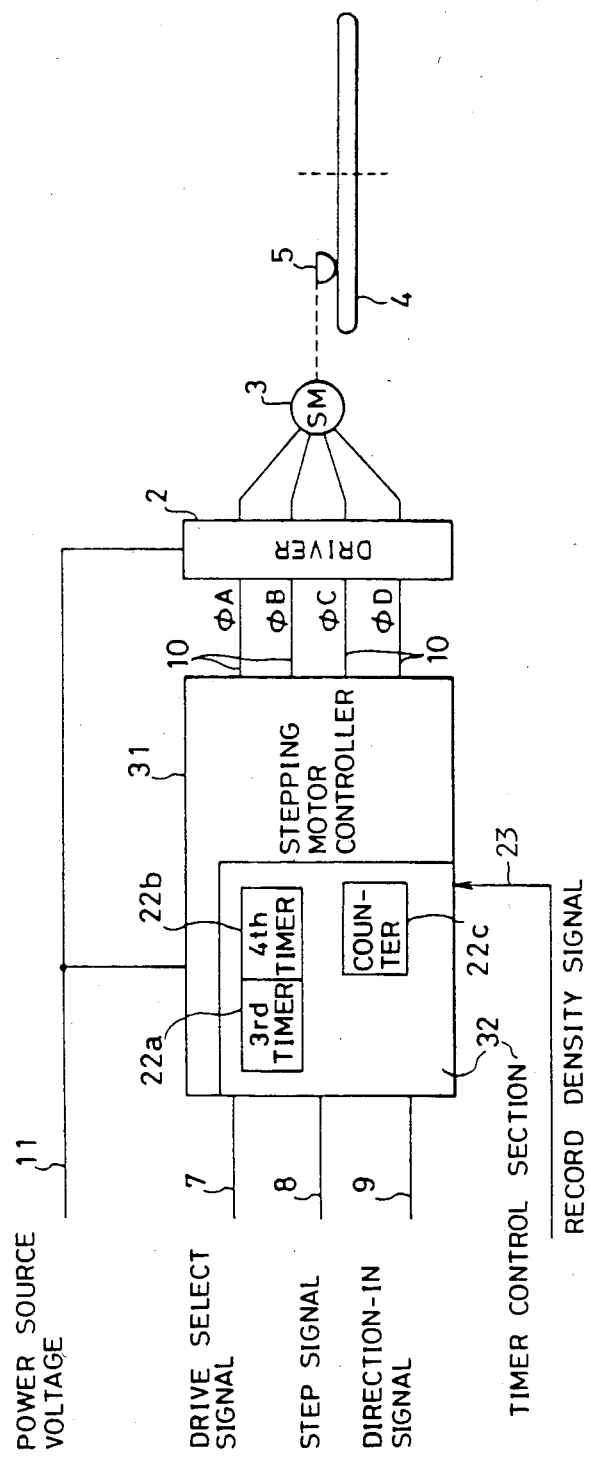
FIG. 9 is a block diagram showing a stepping motor drive control circuit in the third embodiment of the present invention.

FIG. 9 shows an embodiment of a control circuit arrangement in the third embodiment of the present system. In the third embodiment, a recording density signal is introduced into the initial data setting terminal 23 from an external host computer so as to automatically perform initial setting instead of having initial data inputted by the jumping switch 23A. It is equally possible to introduce the recording density signal into the initial data terminal 13 shown in FIG. 3.

FIG. 10 shows an example of the initial data setting procedure in the timer control section 32 shown in FIG. 9. The recording density signal indicates that the recording density is either high or low and supplied into the timer control section 32 from the external host computer (not shown). The timer control section 32 judges the level of the recording density signal. If the level indicates a high recording density, an initial step rate time for high density recording is set at step S21-2. On the other hand, if the timer control section finds that the recording density signal indicates a low density, an initial step rate time for low density recording is set at step S21-3.

Therefore, an initial step rate may be determined automatically according to variation of the step signal cycle in high density recording and low density recording.

Figure 11:
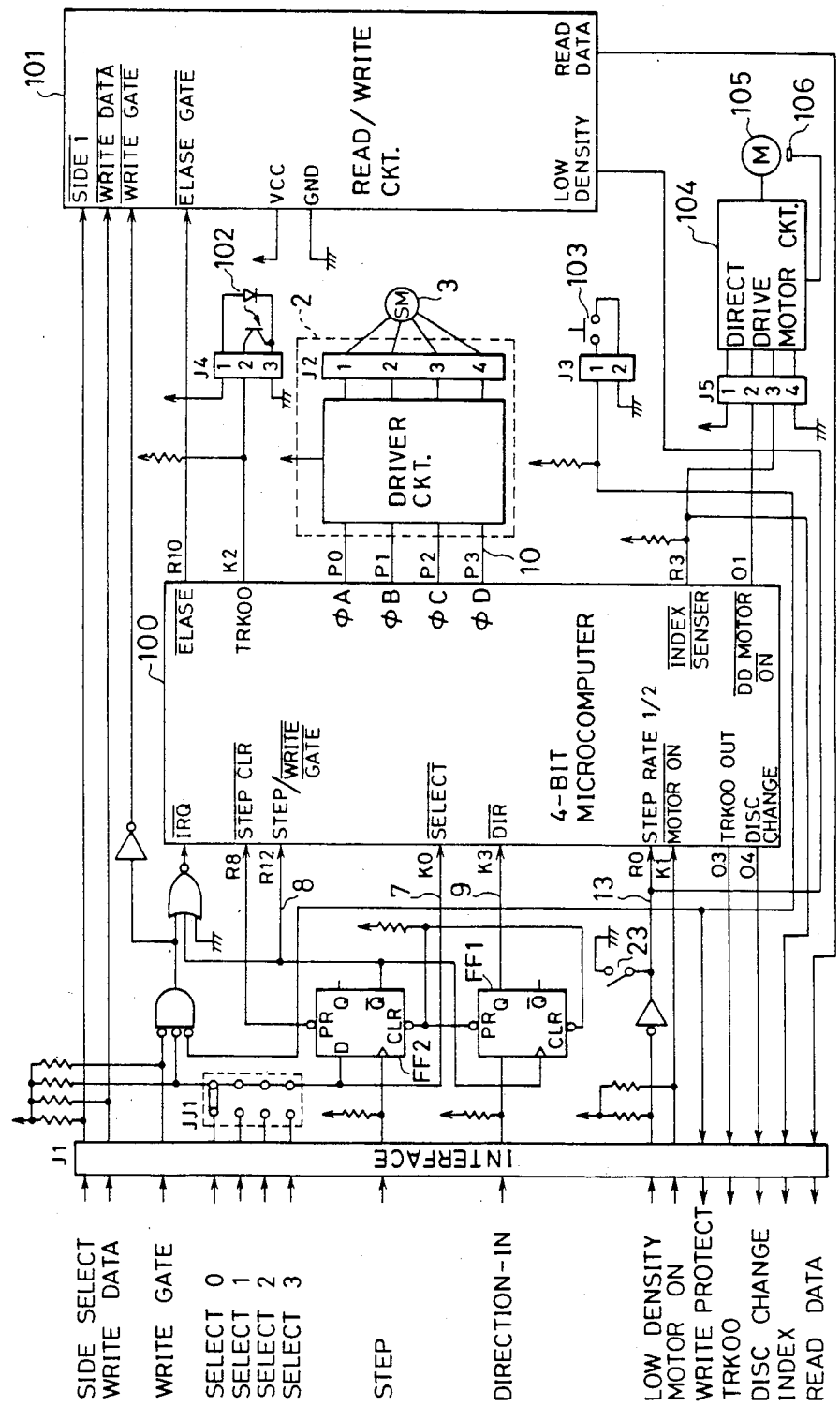
FIG. 11 is a block diagram showing a specific embodiment of the controller 21 or 31 to be applied to the first, second or third embodiment of the present invention.

FIG. 11 shows an embodiment of a detailed arrangement of the controller 21 or 22 to be applied to the first, second or third embodiment.

In FIG. 11, J1 is an interface for exchanging information with the host computer (not shown). J2 to J5 are terminals. Referece numeral 100 denotes a microcomputer for controlling the stepping motor 3 for positioning the head in accordance with the control signals from the host computer through the interface J1.

The microcomputer 100 may be a 4-bit microcomputer MB8855A manufactured by Fujitsu. Reference numeral 101 denotes a read/write circuit for selecting the head which reads data from or writes data into the disc. The read/write circuit 101 may be a CX2018S manufactured by Sony. Reference numeral 102 denotes a sensor for detecting the peripheral end track (track number 0) of the disc. Reference numeral 103 denotes a write protect switch for detecting whether the disc is protected against writing. For example, a mechanical switch can be employed when detecting a write protection for a 3.5-inch floppy disc, and a photo sensor is used for detecting a write protection for a 5-inch or larger floppy disc. Reference numeral 104 denotes a driver for controlling a disc drive motor 105 for rotating the disc. Reference numeral 16 denotes an index sensor for detecting a rotation angle (cycle) of the disc.

The microcomputer 100 executes, in addition to the control procedures shown in FIGS. 5, 8 and 10, operation control procedures for the track sensor 102 and the motor 105 to control these devices. Here, the control procedures for the track sensor 102 and the disc drive motor 105 are omitted, since conventional techniques can be used for the control procedures. Only a brief description is given of various signals to be inputted into or outputted from the interface J1.

"SIDE SELECT" is a signal indicating a disc face on which reading or writing of information is performed, namely, indicating whether it is a front or rear surface. "WRITE DATA" is a signal for information to be written into the disc. "WRITE GATE" is a signal instructing the writing job. "SELECT 0"–"SELECT 3" are signals for selecting one of the disc numbers. A signal selected from "SELECT 0"–"SELECT 3" is supplied as the select signal 7 into a terminal R12 of the microcomputer 100.

"STEP" is a synchronizing signal for use in exciting the stepping motor 3 involved in the present embodiment, and is supplied as the step signal 7 to a terminal R0 of the microcomputer 100 through a flip-flop FF2.

"DIRECTION" is a signal indicating a scanning direction of the head, namely, a rotating direction of stepping motor 3, and is supplied as a direction signal to a terminal K3 of the microcomputer 100 through a flip-flop FF1.

"LOW DENSITY" is a signal indicating whether the recording density is high or low. This signal indicates the exciting timing of the stepping motor 3 in the third embodiment of the present invention. In the third embodiment of the present invention, this recording density signal is supplied to a terminal R0 of the microcomputer 100, but in the first and second embodiments the instruction from a jumping switch is supplied to the terminal R0.

"MOTOR ON" is a signal indicating the driving or stopping of the disc drive motor 104. "WRITE PROTECT" is an output signal from the write protect switch 103, and "TRKOO" is an output signal from the track detect sensor 102. "DISC CHANGE" is an output signal indicating whether the disc is set in the disc drive unit or not. "INDEX" is an output signal from the index sensor 106. "READ DATA" is information read out from the disc and transferred through the read/write circuit 101 from the disc.

While in the above embodiment shown in FIG. 10, the microcomputer 100 is used, it goes without saying that the present invention is applicable not only to the microcomputer described in the present embodiment but also to a system using a general-purpose computer.

What is claimed is:

1. A stepping motor drive control apparatus for controlling the drive of a stepping motor in accordance with a step signal, said stepping motor having a plurality of phase coils which are respectively excited by an excitation system by switching said plurality of phase coils to rotate said stepping motor, said control apparatus comprising:
    measuring means for measuring a cycle of said step signal, said step signal stepping said stepping motor;
    exciting means for switching at least one of said plurality of phase coils of said stepping motor to excite said at least one coil; and
    control means for controlling the switching time of said at least one of said plurality of phase coils excited by said exciting means, such that damping of said stepping motor is minimized in response to a cycle of said step signal measured by said measuring means.

2. A stepping motor drive control apparatus as claimed in claim 1, wherein said exciting means includes a timer circuit for measuring whether the measured time reaches said switching time when said at least one of said plurality of phase coils of said stepping motor is switched.

3. A stepping motor drive control apparatus as claimed in claim 2, wherein said control means includes a memory means for storing time data corresponding to said switching time of said phase coils of said stepping motor, at which damping of said stepping motor is minimized in each of said cycles of said step signal measured by said measuring means in accordance with each cycle and is arranged such that said memory means outputs said time data in accordance with said cycle of said step signal measured by said measuring means.

4. A stepping motor drive control apparatus as claimed in claim 3, wherein said timer circuit is so arranged to determine a measuring time in accordance with time data outputted from said memory circuit.

5. A stepping motor drive control apparatus for controlling the drive of a stepping motor in accordance with a step signal, said stepping motor having a plurality of phase coils which are respectively excited by an excitation system by switching said plurality of phase coils to rotate said stepping motor, said control apparatus comprising:
    measuring means for measuring a cycle of said step signal, said step signal stepping said stepping motor;
    exciting means for switching at least one of said plurality of phase coils of said stepping motor to excite said at least one of said plurality of phase coils; and
    control means for controlling said switching time of said phase coils of said stepping motor in said exciting means in response to said cycle of said step signal measured by said measuring means, so that said switching time of said phase coils in said stepping motor coincides with a time at which said cycle of said step signal measured by said measuring means is equally divided.

6. A stepping motor drive control apparatus as claimed in claim 5, wherein said exciting means includes a timer circuit for measuring whether the measured time reaches said switching time when said at least one of said plurality of phase coils of said stepping motor is switched.

7. A stepping motor drive control apparatus as claimed in claim 6, wherein said control means controls said exciting means in such away that a measuring time of said timer circuit corresponds to a time at which said cycle of said step signal measured by said measuring means is equally divided.

8. A stepping motor drive control apparatus for controlling the drive of a stepping motor in accordance with a step signal, said stepping motor having a plurality of phase coils which are respectively excited by an excitation system by switching said plurality of phase coils to rotate said stepping motor, said control apparatus comprising:
    measuring means for measuring a cycle of said step signal, said step signal stepping said stepping motor;
    exciting means for measuring whether a measured time reaches a switching time when at least one of said plurality of phase coils in said stepping motor is switched to be excited, said at least one phase coil to be excited being switched to be excited when the measured time reaches said switching time;
    first setting means for setting said switching time of said at least one phase coil to be excited by said exciting means in accordance with an external command; and
    second setting means for setting said switching time of said at least one phase coil to be excited by said exciting means in accordance with said cycle of said step signal measured by said measuring means such that damping of said stepping motor is minimized.

9. A stepping motor drive control apparatus as claimed in claim 8, wherein said exciting means includes a timer circuit for measuring whether the measured time reaches said switching time when said at least one of said plurality of phase coils of said stepping motor is switched.

10. A stepping motor drive control apparatus as claimed in claim 9, wherein said timer circuit is so arranged that said switching time is set by either one of said first and second setting means.

* * * * *